E. A. BAKER & S. W. & L. H. JOHNSTON.
PNEUMATIC BUMPER.
APPLICATION FILED JUNE 19, 1915.
1,172,001.
Patented Feb. 15, 1916.
2 SHEETS—SHEET 1.
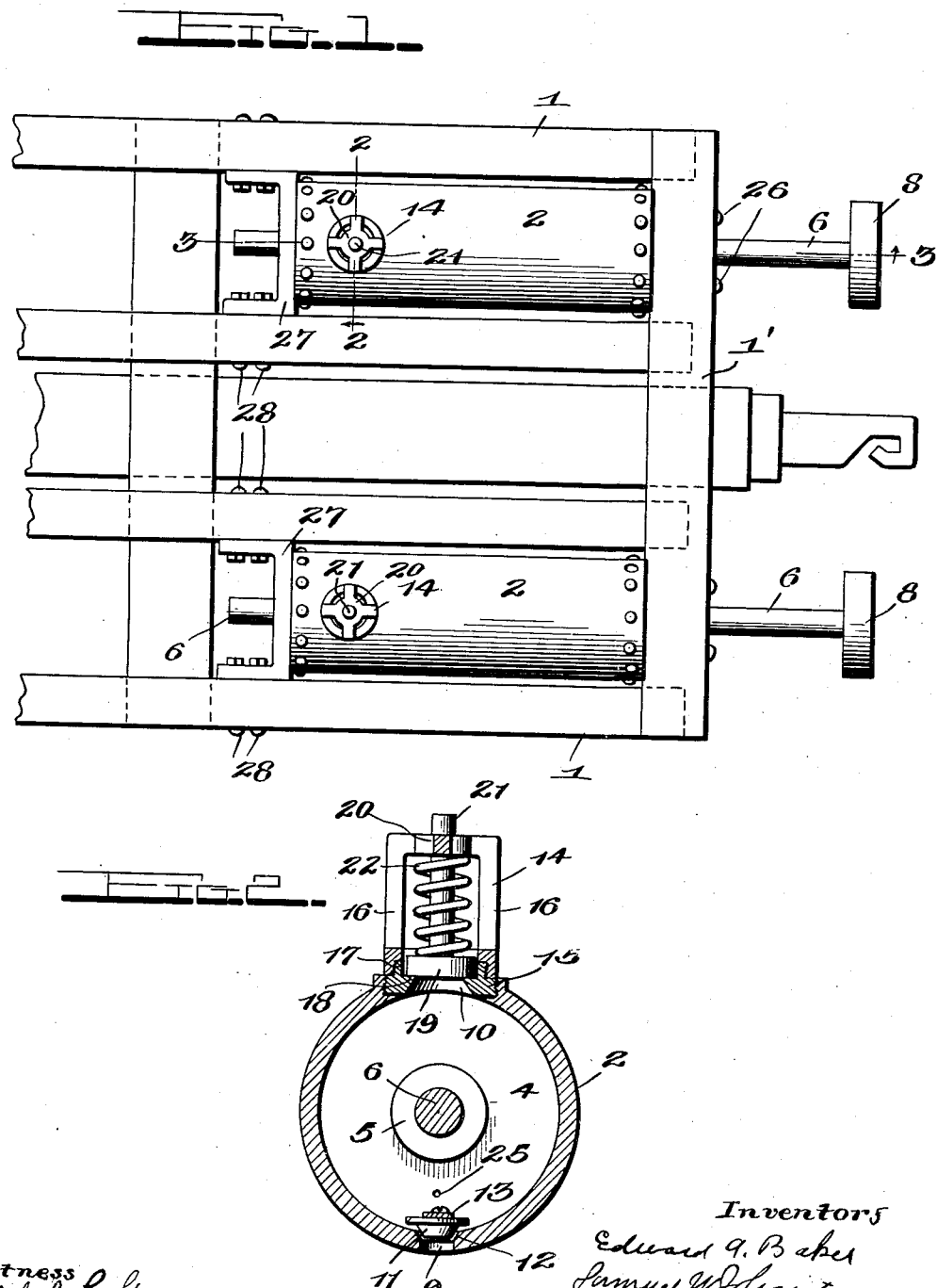

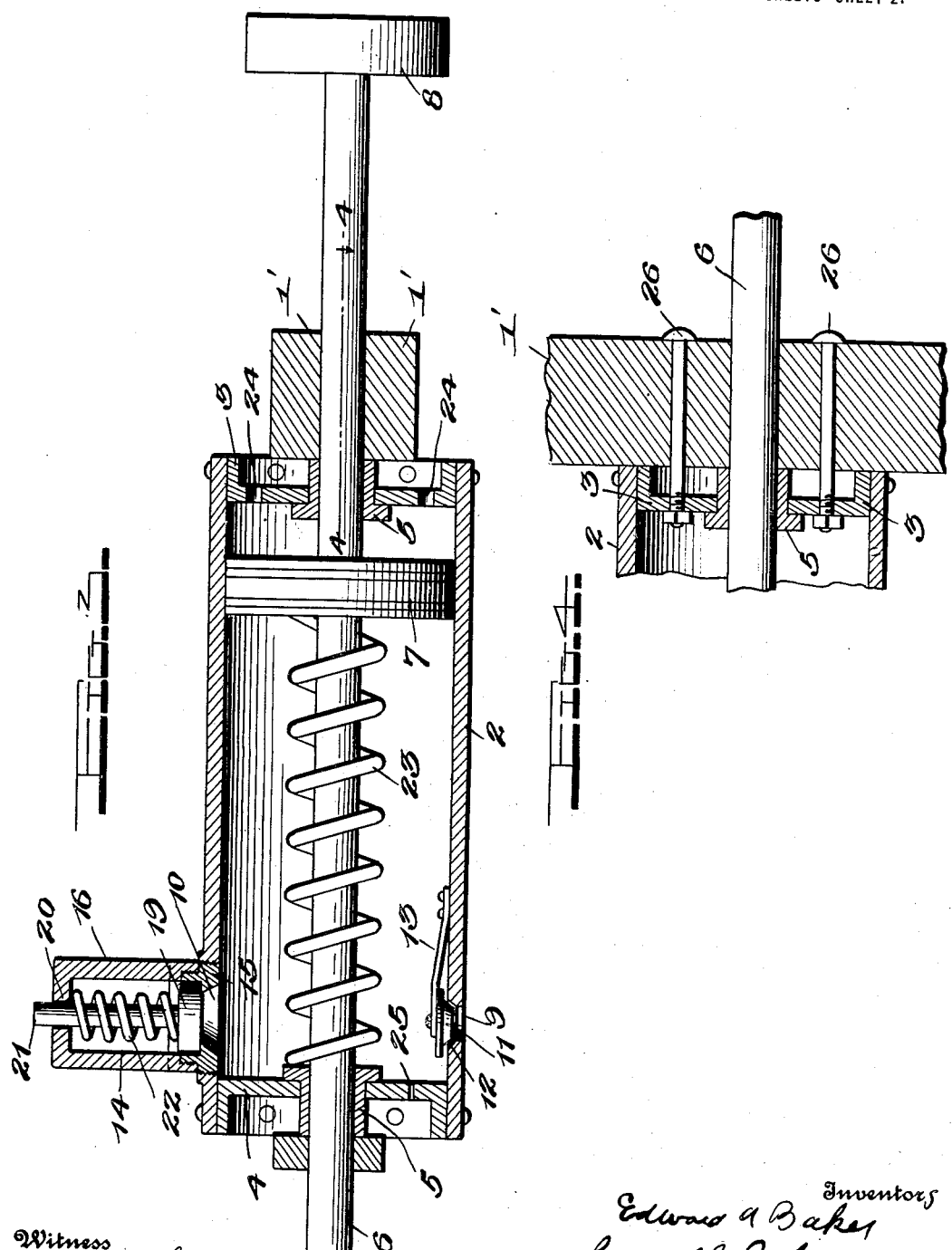

UNITED STATES PATENT OFFICE.

EDWARD A. BAKER, SAMUEL W. JOHNSTON, AND LESLIE H. JOHNSTON, OF MANSFIELD, OHIO.

PNEUMATIC BUMPER.

1,172,001.      Specification of Letters Patent.      Patented Feb. 15, 1916.

Application filed June 19, 1915. Serial No. 35,083.

*To all whom it may concern:*

Be it known that we, EDWARD A. BAKER, SAMUEL W. JOHNSTON, and LESLIE H. JOHNSTON, citizens of the United States of America, residing at Mansfield, in the county of Richland and State of Ohio, have invented certain new and useful Imrovements in Pneumatic Bumpers, of which the following is a specification.

This invention relates to certain new and useful improvements in pneumatic bumpers and more particularly to a type of bumper especially suitable for freight and passenger cars, automobiles and like vehicles.

The invention has for the primary aim to provide a bumper that will always remain in contact with the end sill or bumper of the opposing car thereby eliminating occurrence of any abrupt impact such as frequently accompanies the employment of the ordinary draw-bar with its resultant vibration throughout the cars.

A further object resides in a bumper of simple and durable construction which will give a cushioning effect rather than a mechanical pressure, vibration or jarring.

Further, the invention consists in the salient features of construction, arrangements and combinations of parts hereinafter described and claimed, and which are shown in the preferred embodiment in the accompanying drawings, wherein similar characters of reference designate corresponding parts throughout the several views of which:

Figure 1 is a top plan of the invention applied to a freight car, the latter being in fragment; Fig. 2 is a transverse section through one of the bumpers about on line 2—2 of Fig. 1; Fig. 3 is a longitudinal section taken about on line 3—3 of Fig. 1, partially in elevation; and Fig. 4 shows in section the preferred method of mounting the forward end of the bumper cylinder to the adjacent sill of the car, the view being taken on line 4—4 of Fig. 3.

Referring more in detail to the drawings, the reference character 1 represents one end of the frame of a car, although it may be any suitable support, and 2 the cylinder of the bumper which are preferably arranged in pairs on the ends of the car.

The cylinder 2 has its ends closed by heads 3 and 4 which are formed cup-shape to facilitate the application of the securing rivets. Centrally formed in each cylinder head is an opening to receive a bushing 5 through which a plunger rod 6 is adapted for sliding, a plunger 7 being fixed on the rod for operation in the cylinder. On the forward end of the plunger rod is a bumper 8 of any desirable form though preferably circular.

The rear end portion of the cylinder is formed with an inlet 9 and an outlet 10, the former being normally opened and adapted to be closed by a conical valve 11 supported off its correspondingly contoured seat 12 by leaf spring 13. The outlet 10 is normally closed by a relief or safety valve designated generally by the numeral 14. This comprises a casing composed of a seat section 15 threaded in the cylinder 2 and a housing section 16 threaded to an annular flange 17 of the seat section, which flange surrounds the seat 18 of valve 19. The housing 16 is of open or spider formation having a central bearing 20 slidably receiving the stem 21 of the valve 19. A coiled spring 22 encircles the stem 21 between the bearing 20 and valve 19 to retain the latter normally closed. This spring may be of a desired tension whereby the valve may open accordingly at a predetermined pressure.

The bumper is held projected by a coiled expansion spring 23 encircling the plunger rod 6 and having its terminals bearing against the plunger and a bushing 5 as shown in Fig. 3.

When the bumper encounters an opposing car, the operation is as follows: The plunger travels rearwardly in the cylinder against the air therein, the resultant increase of air pressure seating or closing the inlet valve 11 and retaining it so. In event of a pressure excessive of a predetermined degree, the relief valve 14 is forced open against the action of its spring 22 until a decrease in the pressure to the predetermined or safe degree is reached when the valve will again seat itself. Upon separable movement between the cars, the bumper is accordingly projected by its spring 23, as is obvious.

During the rearward sliding of the bumper, the tendency toward a vacuum in the cylinder in advance of the plunger is overcome by the admission of atmospheric pressure through ports 24 provided in the forward head 3. Preferably, a small aperture 25 is also formed in the rear head 4 to permit of a partial escape of the compressed air prior to the release of the relief valve.

The bumper is fastened to the end sill 1' of the car by bolts 26, which pass through the sill and adjacent cylinder head 3, and by brackets 27 secured between and to longitudinal frame members of the car by bolts 28. An advantage derived from this appliance is that, when the bump of the car takes place, the bumper 10 does not rebound as in the ordinary draw-bar which is provided with a coiled spring.

It will be observed that when a train of freight cars are equipped with these bumpers, they will always remain in contact with the end sill or bumper of the opposing cars, therefore there can not be any abrupt hammering impact take place that will cause a vibration or jar throughout the cars which is common in the use of ordinary drawbars.

It will also be observed that in rounding curves at least one of the bumpers always remains in contact with the sill or part of the bumper of the other car, thereby maintaining a cushioning effect by the contact between them rather than an intermittent or mechanical pressure or jar which results in vibrating the cars.

What is claimed is:

1. In combination with an end sill of a car frame, a bracket spaced therefrom and supported by the car frame, a cylinder interposed between the end sill and bracket, a head for each end of the cylinder provided with a central opening, bushings disposed in the head openings and abutting the end sill and bracket, a plunger operable in the cylinder, a plunger rod slidable through the bushings and openings provided in the end sill and bracket, and a bumper on the plunger rod.

2. In combination with a cylinder having heads at its ends, each head having a central opening, a spring pressed plunger having a rod slidable through said openings, one of said heads having an air inlet which is open to the atmosphere at all times whereby upon the instroke of the plunger air may enter between the plunger and said head to prevent the formation of a vacuum in front of the plunger, an air inlet at the opposite end of the cylinder, normally open dual function unitary means associated with said last named air inlet for allowing air to enter the cylinder and adapted upon the instroke of the plunger to be closed by the air compressed by the latter, and a relief valve at said opposite end of the cylinder.

3. In combination with a cylinder having heads at its ends, each head having a central opening, a spring pressed plunger having a rod slidable through said openings, means to allow air to enter the cylinder in front of the plunger so as to prevent the formation of a vacuum upon the inward movement of the plunger, a relief valve at the opposite end of the cylinder, said opposite end of the cylinder having an air inlet and normally open means associated with said last named air inlet for allowing air to enter the cylinder and adapted upon the instroke of the plunger to be closed by the air compressed by the latter.

4. In combination with an end sill of a car frame, a bracket spaced therefrom and supported by the car frame, a cylinder interposed between the end sill and bracket, a head for each end of the cylinder provided with a central opening, a plunger operable in the cylinder, a plunger rod slidable through the head openings and through openings provided therefor in the end sill and bracket, and a bumper on the plunger rod.

In testimony whereof we affix our signatures in presence of two witnesses.

EDWARD A. BAKER.
SAMUEL W. JOHNSTON.
LESLIE H. JOHNSTON.

Witnesses:
JOHN H. COSS,
MABEL L. GASS.